(12) United States Patent  
Sanders (10) Patent No.: US 8,317,013 B2
(45) Date of Patent: Nov. 27, 2012

(54) AUGER WITH AN EXTENDIBLE FEED AUGER SECTION

(75) Inventor: Jerome Sanders, Manitou (CA)

(73) Assignee: Sakundiak Equipment Ltd., Regina, Sasatchewan (CA)

( * ) Notice: Subject to any disclaimer, the term of this patent is extended or adjusted under 35 U.S.C. 154(b) by 238 days.

(21) Appl. No.: 12/954,715

(22) Filed: Nov. 26, 2010

(65) Prior Publication Data

US 2011/0127138 A1 Jun. 2, 2011

Related U.S. Application Data

(60) Provisional application No. 61/265,032, filed on Nov. 30, 2009, provisional application No. 61/308,613, filed on Feb. 26, 2010.

(51) Int. Cl.
*B65G 21/10* (2006.01)

(52) U.S. Cl. ........ 198/667; 198/668; 198/594; 198/589; 198/313; 198/314; 198/315; 198/316.1; 198/317; 198/318; 414/526

(58) Field of Classification Search .......... 198/312–320, 198/589, 594, 595, 666–668; 414/526
See application file for complete search history.

(56) References Cited

U.S. PATENT DOCUMENTS

| 4,356,910 | A | * | 11/1982 | Togstad | 198/660 |
| 4,530,429 | A | * | 7/1985 | Erickson | 198/313 |
| 4,963,066 | A | * | 10/1990 | Boppart | 414/376 |
| 5,099,986 | A | * | 3/1992 | Kuzub | 198/666 |
| 5,184,715 | A | | 2/1993 | Feterl | |
| 5,234,094 | A | | 8/1993 | Weyerman | |
| 5,305,866 | A | | 4/1994 | Stewart et al. | |
| 5,498,119 | A | * | 3/1996 | Faivre | 414/528 |
| 5,788,055 | A | | 8/1998 | Stewart et al. | |
| 6,805,229 | B2 | | 10/2004 | Dekoning | |
| 7,428,956 | B2 | | 9/2008 | Scherman | |
| 7,946,416 | B2 | * | 5/2011 | Grose et al. | 198/671 |

* cited by examiner

*Primary Examiner* — Mark A Deuble
(74) *Attorney, Agent, or Firm* — Ryan W. Dupuis; Kyle R. Satterthwaite; Ade & Company Inc.

(57) ABSTRACT

An auger assembly transfers particulate material from a source area to a target area using a main auger, an open top swing auger or U-trough, and an extendable loading swing auger connected to one another. The main auger is supported on a wheeled frame similar to conventional grain augers while the U-trough is pivoted thereon, and the extendable loading swing auger is mounted on a rail system on the top of the U-trough. The inlet hopper of the extendable swing auger can be extended out to reach away from the main auger thus can be more easily positioned for proper alignment with the discharge hopper of a particulate material container even when the discharge hopper is within a confined space.

23 Claims, 9 Drawing Sheets

AUGER WITH AN EXTENDIBLE FEED AUGER SECTION

This application claims the benefit of priority under 35 U.S.C. 119 from Provisional application Ser. No. 61/265,032 filed Nov. 30, 2009 and Provisional application Ser. No. 61/308,613 filed Feb. 26, 2010.

The present invention relates to an auger assembly of the type commonly used for conveying particulate material, for example grain and the like, and more particularly relates to an auger assembly having auger tubes that can extend or retract parallel to one another.

BACKGROUND OF THE INVENTION

It is common to use grain augers and the like to transfer grain or other particulate material from a source area to a target area, for example from a transport container to a bin or other storage type container. Transport containers generally involve a container supported for rolling movement along the ground by wheels spaced apart at opposing ends of the container. A hopper type discharge is then typically located between the wheels below the container for discharging into the auger which subsequently conveys the material to the storage container.

U.S. Pat. No. 5,184,715 issued Feb. 9, 1993 to Feterl, U.S. Pat. No. 5,305,866 issued Apr. 26, 1994 and U.S. Pat. No. 5,788,055 issued Aug. 4, 1998 both to Stewart et at and U.S. Pat. No. 4,963,066 issued Aug. 15, 1990 to Boppart disclose various examples of grain augers used for conveying particulate materials. In each instance a main auger is supported on a wheeled frame for positioning of the discharge in alignment with the target area. A swing auger is provided at the inlet of the main auger for alignment with the source area. The hopper at the inlet of the swing auger however is restricted to positioning along an arched path which is difficult to align with the discharge hopper of a transport container. Often due to the narrow space between wheel sets within which a discharge hopper on a transport container is located, it is not possible to displace the swing auger in an arcing motion under the transport container parked beside the main auger without multiple steps of advancing and subsequent reversal of the vehicle position for proper alignment with the discharge hopper on the vehicle with the inlet hopper on the swing auger. The swing augers are thus difficult and time consuming to set up and may result in lost material being transferred due to its poor alignment.

U.S. Pat. No. 7,428,956 (Scherman) issued Sep. 30, 2008 discloses an example of a grain auger used for conveying particulate materials. In this instance, the swing auger pivots on an intermediate auger that can pivot as well. Often due to the limited movement of the dual pivot points, the inlet hopper on the swing auger can not reach all outlet hoppers under long transport containers. Thus the transport vehicle must advance and subsequently reverse position for proper alignment.

A device manufactured and sold by Rodono Industries Ltd. of Alberta, Canada provides a grain auger used for conveying particulate materials. In this instance, the swing auger pivots on a hopper funnel that the swing auger can slide in and out in. The swing auger can only discharge the particulate material when it is nearly fully extended. This is very limiting of where the intake hopper can be positioned to receive particulate material from the source transport container. Thus the transport container must advance and subsequently reverse position for proper alignment.

U.S. Pat. No. 6,805,229 (Dekoning) issued Oct. 19, 2004 discloses an example of a conveyor belt used for conveying particulate materials. In this instance, the conveyor belt could replace the swing auger on a auger assembly. The conveyor belt could also reach out under the source transport container. This type of particulate conveyor is limited to the types of particulates that it can move. Small particulates can leak out of the side of the conveyor, and some crushing of certain particulates can occur. Belt conveyors can freeze up with below freezing damp weather, causing use issues, and durability issues. Thus for certain types of particulates augers are more desirable. This particular patent also covers a conveyor that extends and retracts within itself, not on top of another belt.

On a much larger scale, for example when excavating earth in mines and the like, large conveyor systems can be used which involve multiple conveying sections connected in series as exemplified by U.S. Pat. No. 5,234,094 (Weyerman) issued Aug. 10, 1993 et al which discloses such a conveyor system. These conveyor systems however are mush too large with far too many sections for the simple task of effectively transferring material from a small source such as a transport container to a suitable storage container at the target area with minimal set up time required.

SUMMARY OF THE INVENTION

According to one aspect of the invention there is provided an auger assembly for transporting a particulate material comprising:

a main auger comprising a main auger tube containing a main auger flight therein to transport the material from an inlet end to an outlet end of the main auger tube;

and a feed auger assembly for feeding the material into the inlet end of the main auger;

the feed auger assembly including a hopper at a feed end thereof for loading of the material;

the feed auger assembly having a discharge end pivotally mounted on the main auger for movement to a position at one side of the main auger tube;

the feed auger assembly comprising:

a first auger member having an auger flight therein arranged to discharge into the main auger and being pivotally mounted relative to the main auger;

a second auger member having an auger flight therein and connected to the hopper;

the second auger member being connected to the first auger member for extension movement relative thereto in a direction longitudinal of the auger members to extend and reduce a total length of the feed auger assembly;

the second auger member being mounted on top of the first auger member such that material discharged from the second auger member falls into the first auger member;

the first auger member having a top opening at least partly therealong into which material from the second auger member can fall, the top opening being arranged such that the material from the second auger member falls into the first auger member at different positions of extension movement of the second auger member.

Preferably the top opening extends along the first auger member so as to receive the material from the second auger member in all positions of the second auger member.

Preferably the top opening of the first auger member is arranged such that the first auger member includes an outer container which is generally channel shaped along at least part of its length.

Preferably the first auger member is generally channel shaped along its full length.

Preferably the bottom of the second auger member is connected to the top of first auger member in a slide rail system including rails and rollers movable along the rails.

Preferably the slide rail system includes the rails or rollers arranged along respective top edges of sides of the channel shape.

Preferably the slide rail system includes downwardly depending side members of the second auger member.

Preferably the second auger member includes a tube extending from the hopper to the discharge end thereof.

Preferably there are provided gearboxes coupling the main auger to the first and second auger members such that the augers are commonly driven.

Preferably the main auger tube is longer than feed auger assembly.

Preferably the second auger member is connected to the first auger member for common pivotal movement as one unit relative to the main auger.

Preferably there are provided hydraulic driven wheels mounted on the inlet end of the second auger member or on the hopper for moving the second auger member relative to the first auger member.

Preferably there are provided hydraulic driven wheels mounted on the inlet end of the second auger member or on the hopper for moving the feed auger assembly relative to the main auger.

Preferably pivotal movement between the main auger tube and the open top U-trough is restricted to one axis.

Preferably the main auger tube is supported on a wheeled frame supported for rolling movement in a longitudinal direction of the frame and the main auger tube supported thereon.

Preferably the wheeled frame includes a hitch for connection to a towing vehicle.

Preferably the inlet of the feed auger assembly is lower in elevation than the hitch.

Preferably there is provided a slide connection mounting the second auger member on top of first auger member.

Preferably the first auger member includes a generally channel shaped portion along at least part of its length with upstanding side walls and wherein there are provided supports on the side walls for carrying the second auger member in sliding movement along the supports.

Preferably the supports comprise flanges on the side walls.

Preferably the second auger member comprises a housing with side walls and an open bottom mounted at an upper end of the tube thereof.

Preferably the side walls of the housing mount on the first auger member for sliding therealong.

Preferably the first auger member has a channel shaped portion mounted on top of the tube thereof with side walls of the channel shaped portion and side walls of the housing cooperating in sliding movement with a bearing material therebetween.

Preferably the housing is contained within the channel shaped portion.

The arrangement described hereinafter therefore provides a method of transferring particulate material from a source area to a target area, the method comprises;

providing an auger assembly including a main auger, a U-trough and an extendable loading auger in which the main auger is supported on a main frame, the U-trough is pivoted relative to the main auger and the extendable loading auger is attached with a rail system to the top of the U-trough;

aligning an outlet end of the main auger with the target area;

positioning an inlet end of the extendable loading auger below the source area by pivoting the combination of the U-trough and the extendable loading auger relative to the main auger and extending out the extendable loading auger; and driving rotation of the augers to convey the particulate material from the inlet of the loading auger to the outlet of the main auger.

The combination of a single main auger with a U-trough and an extendable loading auger is particularly suited for proper alignment of the inlet hopper with the discharge of a transport container unlike prior art auger assembles which rely on a single or dual swing auger configuration. By combining a U-trough and an extendable loading auger, the inlet hopper is permitted to be placed, with greater reach, any number of positions in all directions relative to the inlet of the main auger once the main auger is already in alignment with the target area.

There may be provided gearboxes coupling the main auger to the U-trough and the main auger to the extendable loading auger such that the augers are commonly driven. Preferably the main auger is connected to an input drive shaft having a power take off coupling for driving the main auger directly. The U-trough and the extendable loading auger can thus be driven off of the rotation of the main auger through the gearboxes.

Preferably the main auger tube is supported on a wheeled frame having a hitch and is much longer than the U-trough and the extendable loading auger swing tube combined.

The loader hopper preferably includes an enclosed bottom and side walls extending upwardly to the open top end. The loader hopper can be supported adjacent the ground by supporting the loading swing auger tube substantially below the main auger tube.

Pivotal movement of the combination of the U-trough and the extendable loading auger tube relative to the main auger tube is restricted about one axis and may be power assisted by proving hydraulic drive to the wheels under the inlet hopper.

The inlet of the extendable loading auger is preferably lower in elevation than the hitch.

The combination of the U-trough and the extendable loading auger may be pivoted into a transport position relatively parallel to the main auger tube, by pivoting the outlet of the U-trough on the inlet of the main auger tube.

The invention described herein also provides a method of transferring particulate material from a source area to a target area, the method comprising: providing an auger assembly including a main auger, a U-trough and an extendable loading auger such that the power driving the main auger is also transferred through gear boxes simultaneously driving both the U-trough and the extendable loading auger positioned above the U-trough; in which the main auger is supported on a main frame, and the joint U-trough and extendable loading auger pivot as one unit relative to the main auger; aligning the outlet end of the main auger with the target area; positioning the inlet end of the extendable loading auger below the source area by pivoting the U-trough and extendable loading auger relative to the main auger and sliding the loading auger out or in from the U-trough; and driving rotation of the augers to convey the particulate material from the inlet of the extendable loading auger to the outlet of the main auger.

Preferably the method includes pivoting the U-trough and the extendable loading auger into a transport position in which both the U-trough and the extendable loading auger are substantially parallel hanging alongside the main auger.

Preferably the method includes pivoting the U-trough and extendable loading auger into a loading position perpendicular to a longitudinal direction of the main auger in which the sliding loading auger is movable parallel in direction to the U-trough by sliding out or in on top of the U-trough on a rail system.

Preferably there is provided a slide connection mounting the second auger member connected on top of first auger member.

Preferably the first auger member is generally channel shaped along at least part of its length with upstanding side walls and wherein the slide connection includes a supports on the side walls for carrying the second auger member in sliding movement along the supports.

Preferably the supports comprise flanges on the side walls defining shoulders.

Preferably the second auger member comprises a housing with an open bottom at an upper end of the tube thereof which housing has sides which mount on the shoulders.

Preferably the first auger member has side walls upstanding from the shoulders and the housing has side walls cooperating in sliding movement with the side walls of the first auger member with a bearing material therebetween.

Preferably the first auger member has a container portion defining a receptacle within which the housing is received and along which the housing can slide.

One embodiment of the invention will now be described in conjunction with the accompanying drawings in which:

BRIEF DESCRIPTION OF THE DRAWINGS

FIG. 3 and FIG. 4 are end elevation views of the auger assembly. In FIG. 3 the extendable loading auger has been extended, and in FIG. 4 the extendable loading auger has been retracted on top of the U-trough.

In the drawings like characters of reference indicate corresponding parts in the different figures.

DETAILED DESCRIPTION

Referring to the accompanying figures there is illustrated an auger assembly generally indicated by reference numeral 10. The assembly 10 generally comprises a main auger tube 12, and a feed auger assembly including an open top swing auger tube or U-trough 14 and an extendable loading auger tube 16 containing an auger flight 16A.

The main auger tube 12 is elongate in a longitudinal direction from an inlet end 18 to an outlet end 20 thereof. A main auger is contained within the main auger tube for conveying the material from the inlet to the outlet. A wheeled frame 22 is provided for supporting the main auger for rolling movement along the ground. The frame 22 supports the main auger at an upward incline towards the outlet which supports a discharge hopper 24 thereon. The frame 22 is similar to conventional frames for grain augers which may include a height adjustment mechanism and the like.

The frame 22 extends in the longitudinal direction of the main tube and includes a hitch bar 26 which extends from the inlet end of the main auger beyond the main auger. The frame 22 slopes downwardly at the same slope as the main auger to meet the hitch bar 26 spaced below the inlet end 18.

The open top swing auger tube or U-trough 14 contains an auger 60 therein for conveying material there through in the longitudinal direction of the tube from an inlet top 28 to the outlet end 30 of the U-trough. The outlet end 30 is pivotally coupled to the inlet end of the main auger for pivotal movement about a single axis of rotation extending perpendicular to the longitudinal direction of each of the tubes 12 and 14 respectively. The U-trough is pivotal about an upright axis perpendicular to both tubes 12 and 14 as well as being pivotal about a lateral axis 56 at the same connection permitting both side to side pivoting motion and up and down pivoting motion at the U-trough 14 and extendable loading auger 16 relative to the main tube 12. A hydraulic cylinder 62 is mounted on top of the tube 16 on top of the U-trough 14 to hydraulically extend the tube 16.

The extendable loading auger tube 16 contains a loading auger 58 therein for conveying the particulate material from the inlet 32 to the outlet 34 in the longitudinal direction thereof. The bottom side of the extendable loading auger tube 16 is connected to the top side of the U-trough 14 with a rail system 36. The rail system 36 allows the extendable loading auger tube to extend in or out on top of the U-trough in a parallel movement. The rail system 36 includes a pair of tracks 36A mounted on depending flanges 36B running along the bottom of the auger tube 16 and a plurality of wheels 36C attached to the top edge 36D of the side walls of the trough.

One gearbox 38 is mounted at the inlet 18 of the main tube 12 linking power from the drive line 40 to two gearboxes 42A and 42B mounted at the U—trough 14, and in line with the extendable loading auger tube 16 linking auger shafts of the main auger and U—trough, and the extendable loading auger. The gearboxes are suitable arranged to maintain a driven connection between the augers as the U-trough and extendable loading auger are both pivoted relative to the main auger tube. In this arrangement rotation of the U-trough auger and the extendable loading auger are both driven by the main auger.

The gear box 42A drives a shaft 42C which extends into the core of the flight 16A. The shaft is keyed to the core so that it drives rotation of the core but the shaft can slide into and out of the core when the auger 16 is moved in and out. The gear box 42B drives a shaft 42D which drives the core of the flight 14A.

The trough 14 as shown is open along its full length so as to allow the material to drop into the trough at any position of the auger 16. However the trough may be closed at the top at parts of its length. The trough 14 may be formed from a tube with cut out sections along its length. The cut out sections may be full width as shown to take material from the full width of the tube 16 or may be narrower than the full width of the auger flight with the tube 16 including some form of spout to guide the material into the slot.

The extendable loading tube 16 is supported substantially below the main auger tube 12 in elevation with the inlet end 32 below the hitch bar 26 of the frame adjacent the ground. A loading hopper 44 is mounted at the inlet end 32 to receive the particulate material discharged from the source area to be conveyed to the target area.

The loading hopper 44 includes an enclosed bottom 46 with four side walls 48 extending upwardly there from to open end 50. The bottom and side walls fully surround the inlet end 38 of the loading auger. The inlet hopper is pivotal at 54 relative to the extendable loading auger tube 16 to ensure that the loading hopper 44 is pivotal about the longitudinal axis of the extendable loading auger tube and the U-trough relative to the gearboxes 42. In this arrangement the loading hopper has three degrees of freedom to permit the loading hopper to remain level as it is displaced anywhere along the ground about the inlet end of the main auger.

A drive line 40 couples through the gear box 38 for directly driving the main auger within the main auger tubes. It is derisible to drive the main auger directly as the main auger is typically much longer than the U-trough and the extendable loading auger tube combined. The drives line 40 extends out from the front of the inlet area 18 of the main auger 12 along the hitch bar 26 towards the hitch at the free end thereof which connects to the towing vehicle. The free end of the driveline 40 includes a suitable coupling 52 thereon of the type which readily connects the power takeoff shaft connector of the towing vehicle so that all of the augers can be commonly driven through the gearboxes by the power takeoff of the towing vehicle.

In use, the augers are operated commonly by driving rotation thereof so that material received in the loading hopper is conveyed through the extendable loading auger tube to the U-trough and in turn the main auger tube which discharges the material at the outlet end thereof. Typically the auger assembly is moved about on its wheeled frame for first aligning the main auger with the target area. Once in position a transport container comprising source particulate material is positioned along side the auger assembly.

By pivoting the U-trough and the extendable loading auger tube relative to the main auger tube, and by extending the extendable loading auger tube out on the rail system parallel with the U-trough away from the inlet of the main auger tube, the inlet hopper can be positioned below the discharge hopper of the source material. The hitch bar extends beyond the inlet of the main auger tube longer than the U-trough so that the hitch at the free end thereof is unobstructed for connection to the towing vehicle.

By extending the extendable loading auger tube out or away from the inlet of the main tube, the inlet hopper can be positioned below the discharge of the source material. This substantially linear of travel direction allows the inlet hopper to be extended within narrow spaces such as when accessing the discharge hopper of a transport container which is confined between two wheel sets below the container.

Figure 8:
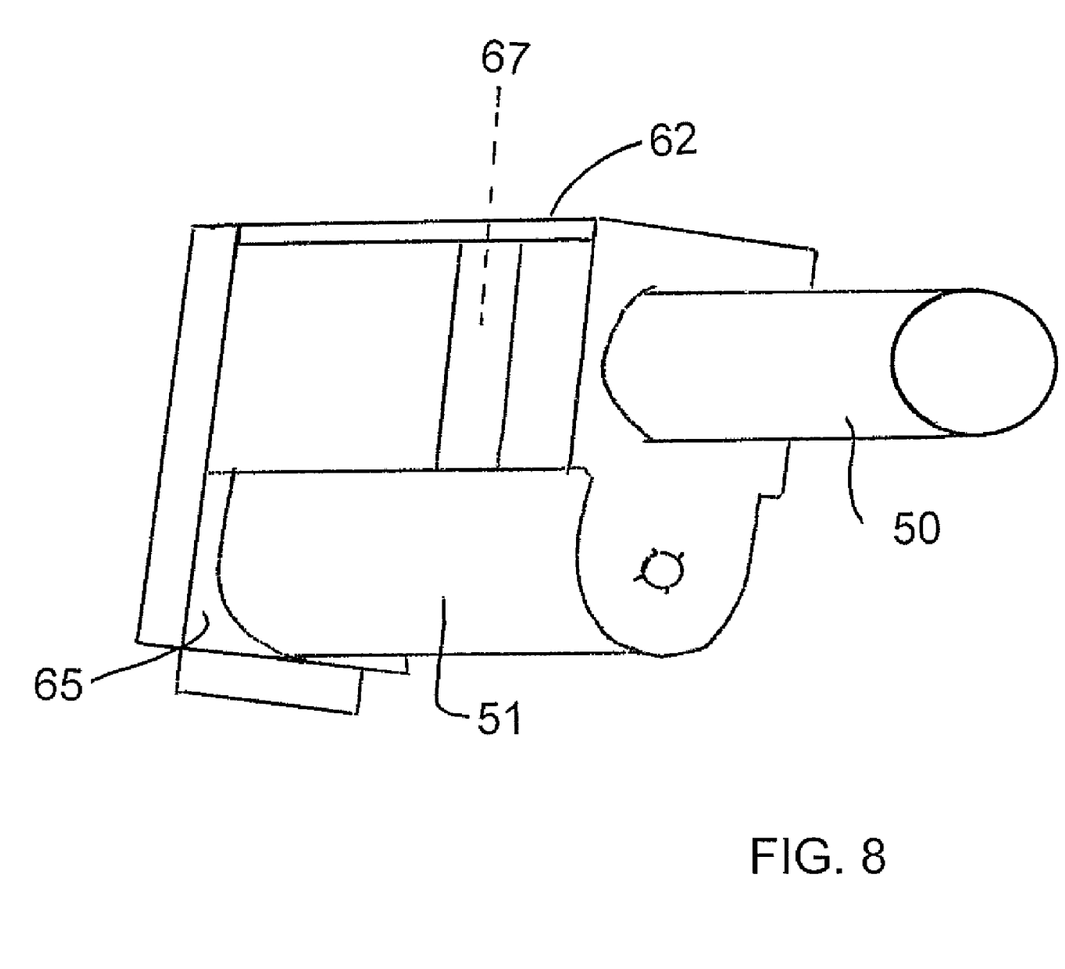
FIGS. 8, 9 and 10 show an alternative arrangement for mounting the second lower auger on the first upper auger for sliding movement.
Figure 9:
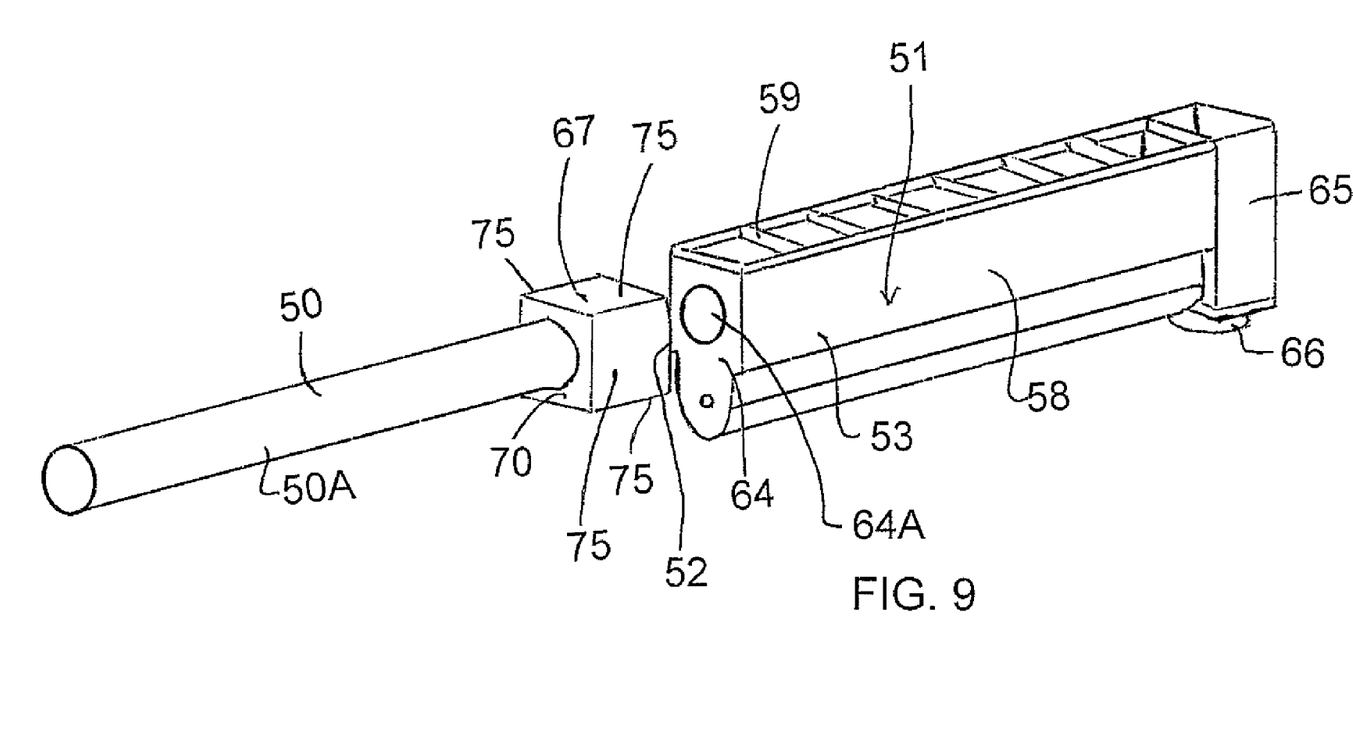
Figure 10:
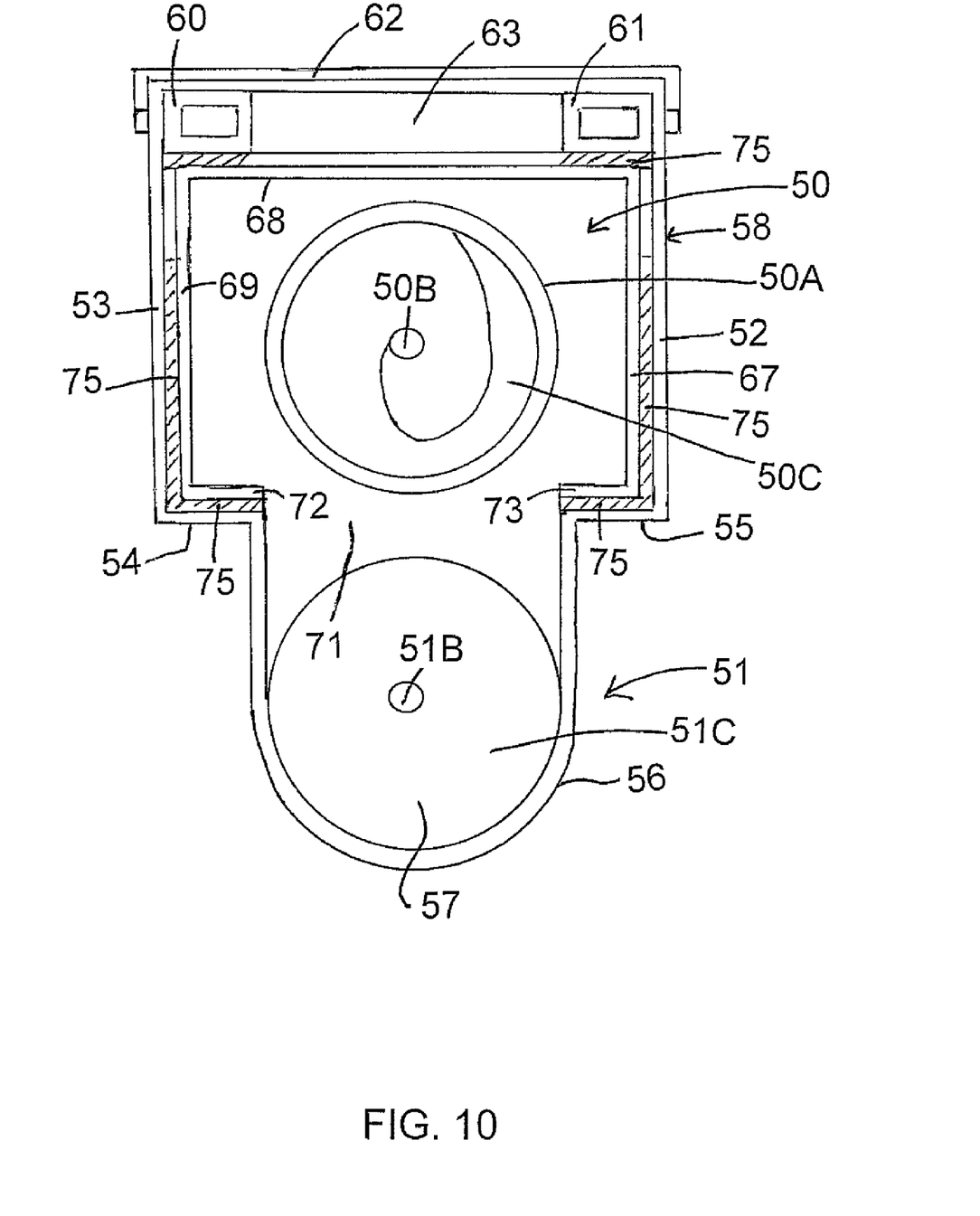

In FIGS. 8, 9 and 10 is shown an alternative slide connection mounting the second auger member 50 connected on top of first auger member 51.

The first auger member 51 is generally channel shaped along at least part of its length with two additional upstanding side walls 52 and 53 and the slide connection includes supports 54 and 55 on the side walls for carrying the second auger member in sliding movement along the supports. The supports are defined by shoulders located between the channel shaped portion 56 receiving the flight 57 of the first auger and the side walls 52, 53. These shoulders project outwardly and are located on the inside of a generally channel shaped receptacle 58 along the top of the first auger. This is formed by the two metal side walls 52 and 53 which are connected by a ladder frame 59 defined by side tubes 60 and 61 and a series of connecting tubes 63. A lid 62 can be placed on top of the open ladder frame to keep the open top closed when required. The channel 58 is closed at the front end by a front plate 64.

The channel connects at the rear end to a receptacle 65 with a bottom discharge 66 for dumping into the top of the main auger (not shown).

The channel and the side walls 52 and 53 form a receptacle for a mounting portion of the second auger 50. The mounting portion is in the form of a rectangular box 67 with a top 68, sides 69, front wall (not visible) and rear wall 70 attached to the end of the tube 50A of the second auger 50. The bottom is basically open at 71 to allow the material from the auger tube 50A to enter the box and drop downwardly into the first auger trough. The bottom has two side flanges 72 and 73 which sit on the shoulders 54 and 55. The top surface 68 has two side edges which butt against the bottom of the tubes 60 and 61.

As previously shown the first auger 51 and the second auger 50 include a shaft 50B and 51B carrying a flight 50C and 50D within the respective tube portion 50A and 56. The shafts are driven by respective gear boxes 42 (FIG. 7) and the shaft 50B is extendible to communicate drive to the flight 50C in its various positions of extension along the first auger member 51.

Plastic sliding bearing material sheets 75 are provided between the contacting portions at the sides and on the shoulders and underneath the tubes so as to allow the box to slide in the receptacle while being maintained in position therein.

Thus the first auger member has side walls 52, 53 upstanding from the shoulders 54, 55 and the housing 67 has side walls 67, 69 cooperating in sliding movement with the side walls 52, 53 of the first auger member with a bearing material 75 therebetween.

Thus the first auger member 51 has a container portion 51A defining a receptacle within which the housing 67 is received and along which the housing can slide by a slide connection mounting the second auger member 50 on top of first auger member 51.

The first auger member includes a generally channel container shaped portion 51A along at least part and preferably all of its length with upstanding side walls 52, 53 the shoulders 54, 55 provide supports in the form of flanges on the side walls 53, 53 for carrying the housing 67 of the second auger member 50 in sliding movement along the supports.

Thus the first auger member 51 has a channel shaped portion mounted on top of the tube 51A thereof with side walls 52, 53 of the channel shaped portion and side walls 67, 69 of the housing 67 co-operating in sliding movement with a bearing material therebetween and with the housing 67 contained within the channel shaped portion 58 of the first auger.

The provision of the housing 67 sliding within the channel 57 locates the housing 67 and maintains the first and second augers parallel. The end wall 64 of the first auger includes a hole 64A which receives and guides the outside surface 50B of the tube 50A so that the tube 50A is guided at two spaced positions by the wall 64 and by the housing 67 in the channel so that it is held in its required position as it moves longitudinally. Movement is effected by a cylinder (not shown) similar to the cylinder 62.

Figure 1:
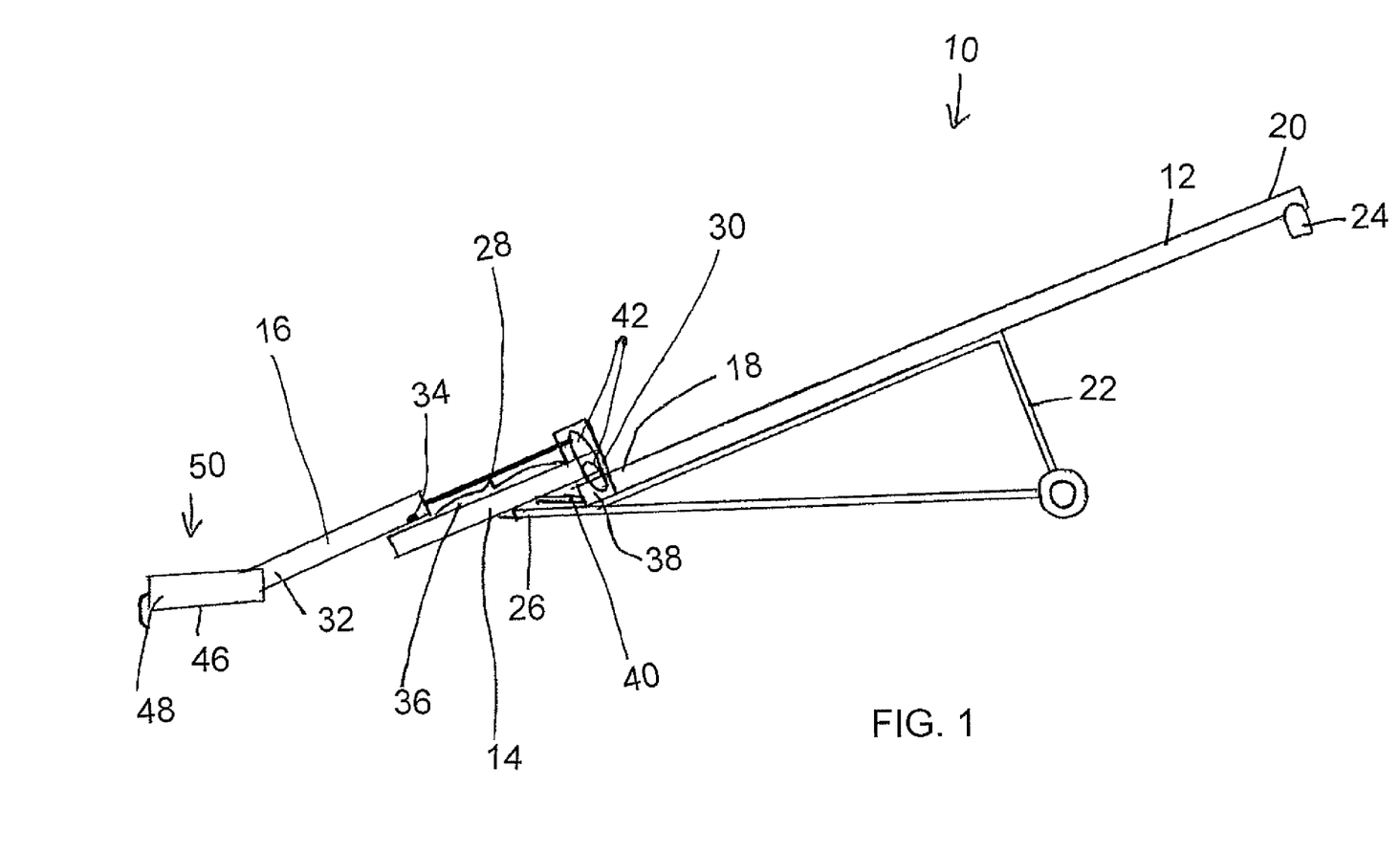
FIG. 1 is side elevation view of the auger assembly according to the present invention.
Figure 2:
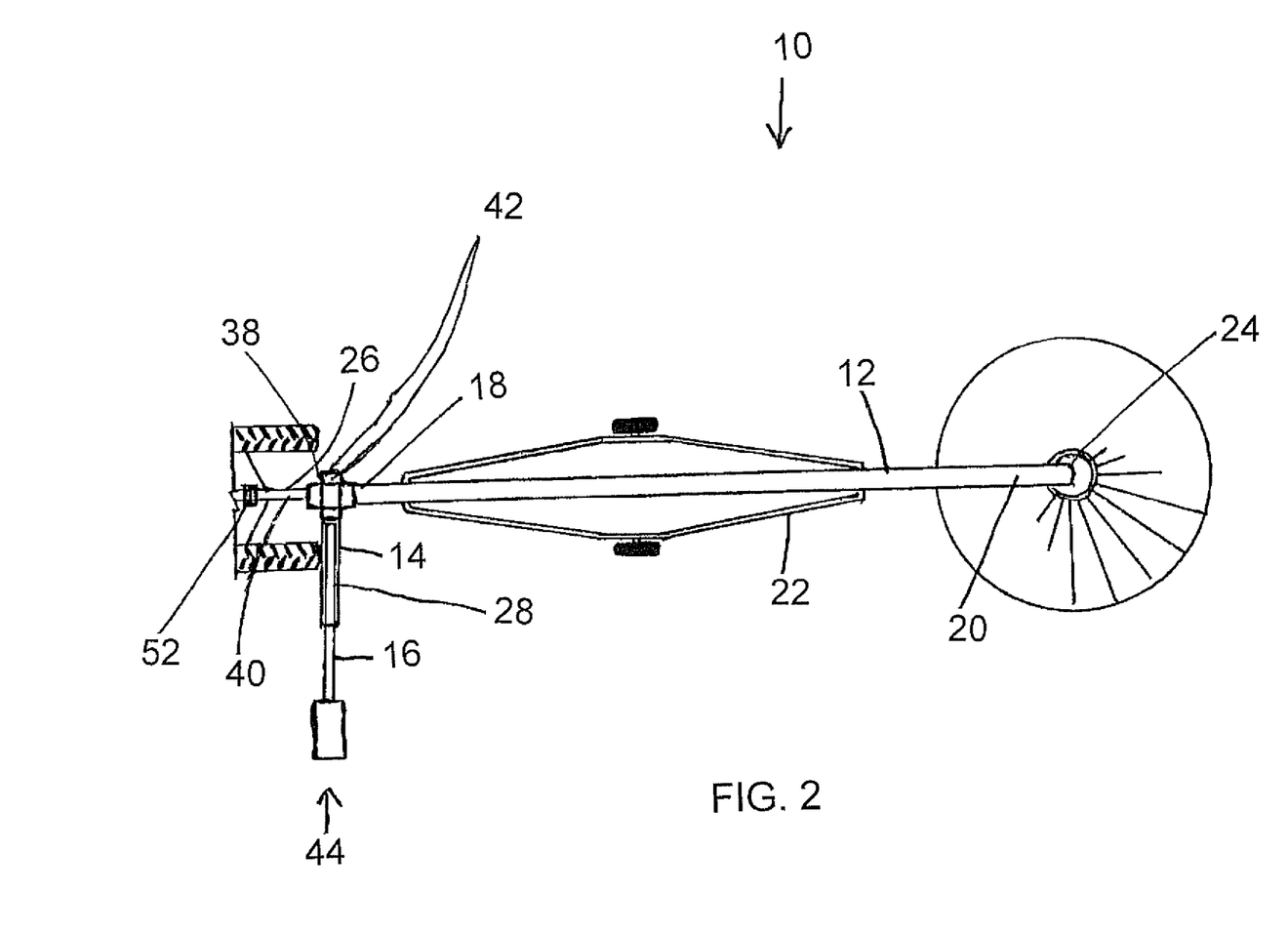
FIG. 2 is a top plan view of the auger assembly.
Figure 3:
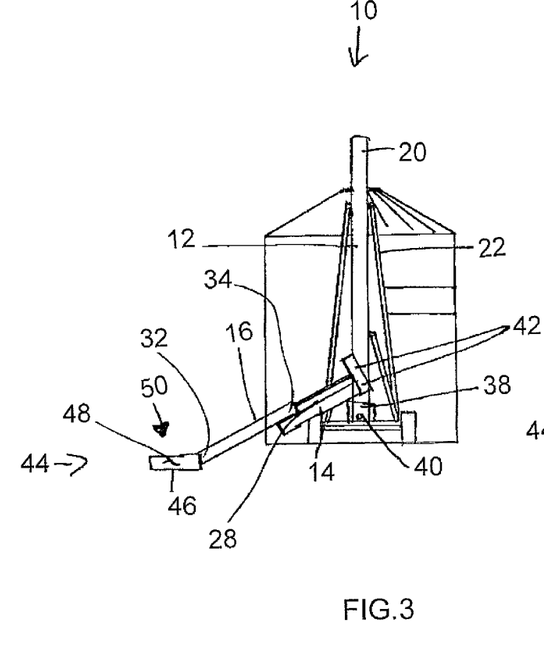
Figure 4:
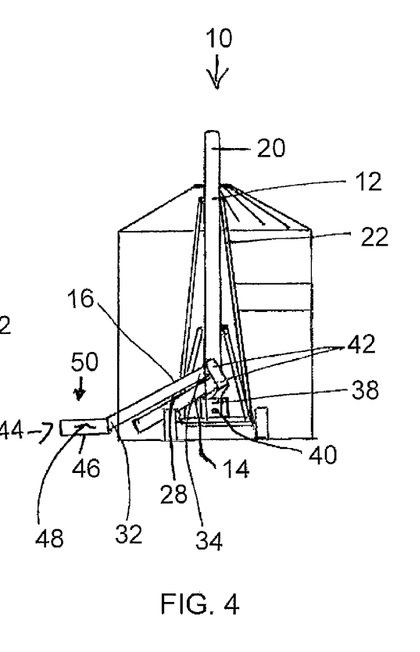
Figure 5:
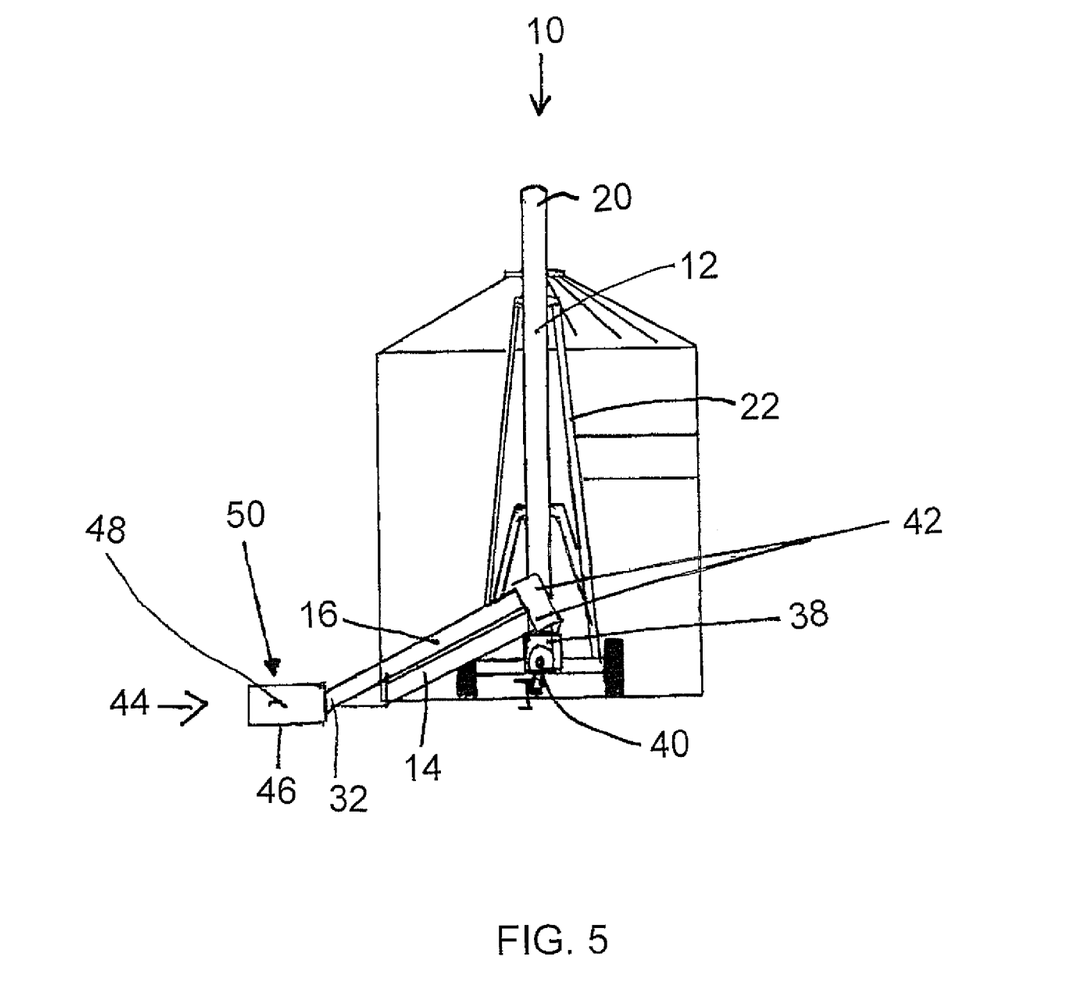
FIG. 5 is an enlarged end elevation view showing the extendable loading auger partially extended on the rail system on top of the U-trough.
Figure 6:
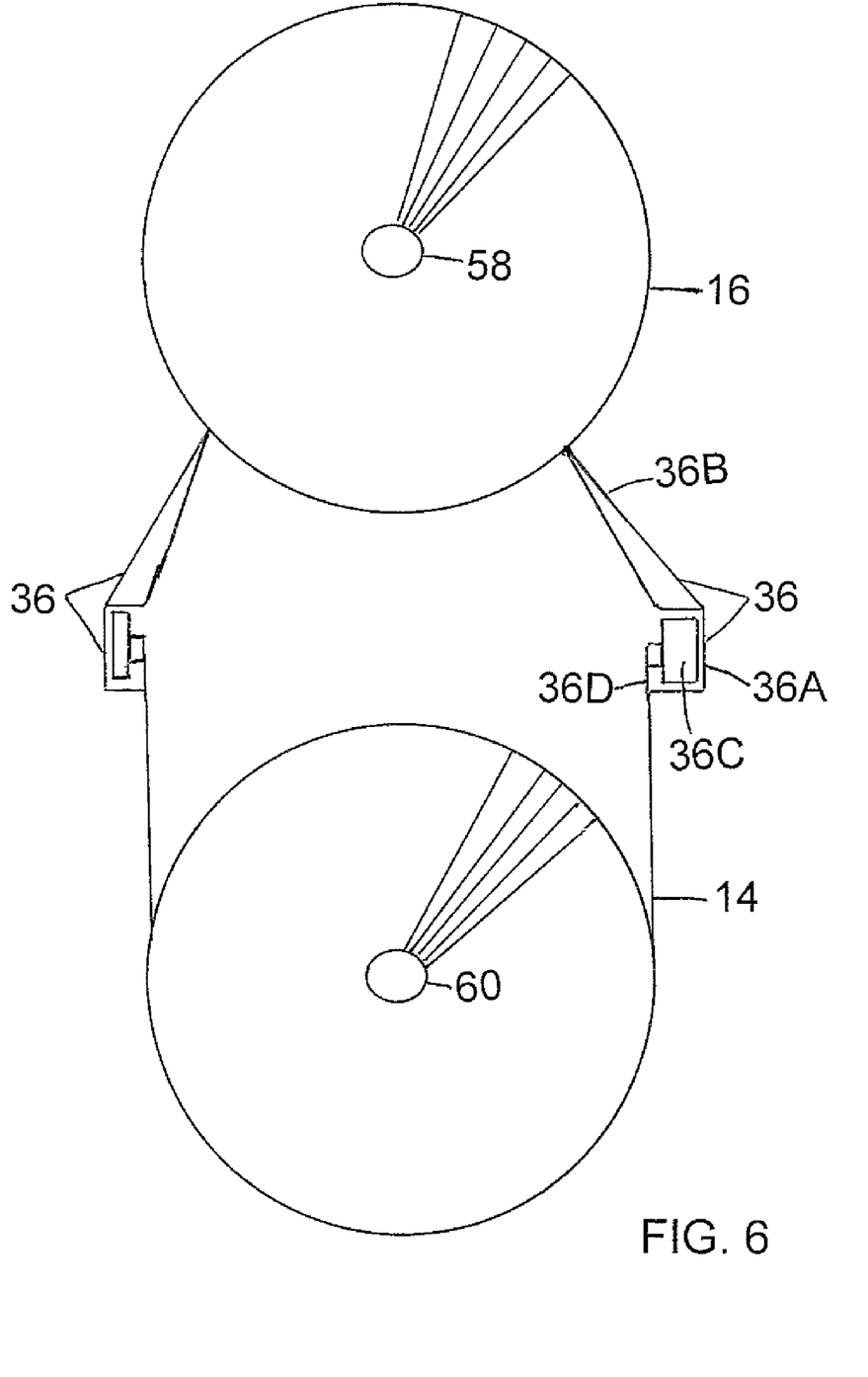
FIG. 6 is a transverse cross sectional view showing the extendable loading auger partially mounted on the rail system on top of the U-trough.
Figure 7:
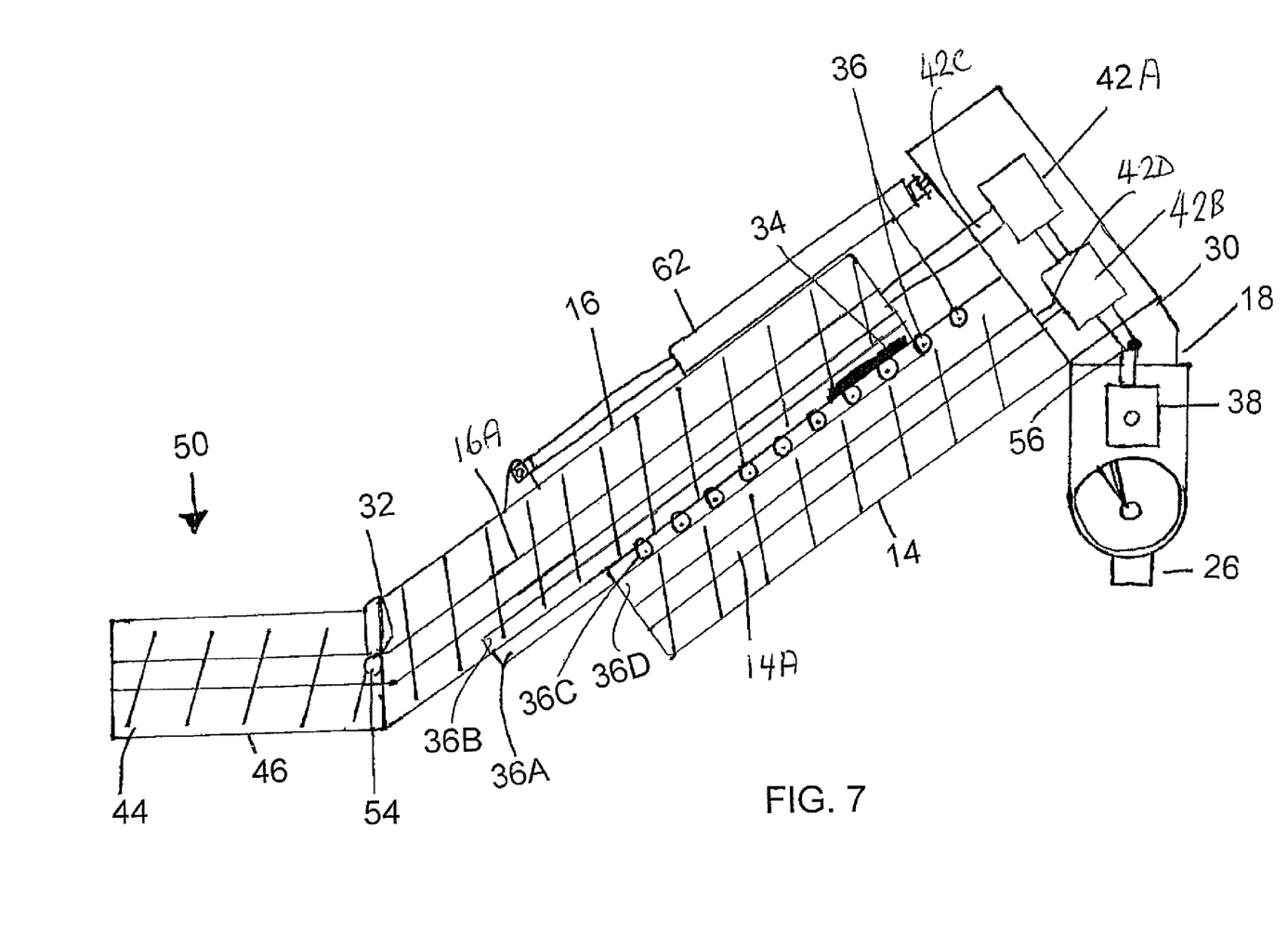
FIG. 7 is a longitudinal cross sectional view showing the extendable loading auger mounted on the rail system on top of the U-trough.

In an alternative arrangement (not shown) the housing 67 can site on a pair of rails at the location of the shoulders 54, 55 to guide the housing 67 in its movement, with the container 58 defined by the side walls 52, 53 omitted in a similar manner to that shown in FIG. 7.

Since various modifications can made in my invention as herein above described, and many apparently widely different embodiments of same made within the spirit and scope of the claims without department from such spirit and scope, it is intended that all matter contain in the accompanying specification shall be interpreted as illustrative only and not in a limiting sense.

The invention claimed is:

1. An auger assembly for transporting a particulate material comprising:

a main auger comprising a main auger tube containing a main auger flight therein to transport the material from an inlet end to an outlet end of the main auger tube;

and a feed auger assembly for feeding the material into the inlet end of the main auger;

the feed auger assembly including a hopper at a feed end thereof for loading of the material;

the feed auger assembly having a discharge end pivotally mounted on the main auger for movement to a position at one side of the main auger tube;

the feed auger assembly comprising:

a first auger member having an auger flight therein arranged to discharge into the main auger and being pivotally mounted relative to the main auger;

a second auger member having an auger flight therein and connected to the hopper;

the second auger member being connected to the first auger member for extension movement relative thereto in a direction longitudinal of the auger members to extend and reduce a total length of the feed auger assembly;

the second auger member being mounted on top of the first auger member such that material discharged from the second auger member falls into the first auger member;

the first auger member having a top opening at least partly therealong into which material from the second auger member can fall, the top opening being arranged such that the material from the second auger member falls into the first auger member at different positions of extension movement of the second auger member.

2. The auger assembly according to claim 1 wherein the top opening extends along the first auger member so as to receive the material from the second auger member in all positions of the second auger member.

3. The auger assembly according to claim 1 wherein the top opening of the first auger member is arranged such that the first auger member includes an outer container which is generally channel shaped along at least part of its length.

4. The auger assembly according to claim 1 wherein the first auger member is generally channel shaped along its full length.

5. The auger assembly according to claim 1 wherein the bottom of the second auger member is connected to the top of first auger member in a slide rail system including rails and rollers movable along the rails.

6. The auger assembly according to claim 4 wherein the slide rail system includes the rails or rollers arranged along respective top edges of sides of the channel shaped first auger member.

7. The auger assembly according to claim 5 wherein the slide rail system includes downwardly depending side members of the second auger member.

8. The auger assembly according to claim 1 wherein the second auger member includes a tube extending from the hopper to the discharge end thereof.

9. The auger assembly according to claim 1 wherein there are provided gearboxes coupling the main auger to the first auger member and again the main auger to the second auger member such that the main auger and the first and second auger members are commonly driven.

10. The auger assembly according to claim 1 wherein the main auger tube is longer than feed auger assembly.

11. The auger assembly according to claim 1 the second auger member is connected to the first auger member for common pivotal movement as one unit relative to the main auger.

12. The auger assembly according to claim 1 wherein there are provided hydraulic driven wheels mounted on the inlet end of the second auger member or on the hopper for moving the second auger member relative to the first auger member.

13. The auger assembly according to claim 1 wherein pivotal movement between the main auger tube and the feed auger assembly is restricted to one pivot axis.

14. The auger assembly according to claim 1 wherein the main auger tube is supported on a wheeled frame for rolling movement in a longitudinal direction of the frame.

15. The auger assembly according to claim 14 wherein the wheeled frame includes a hitch for connection to a towing vehicle.

16. The auger assembly according to claim 15 wherein the inlet of the feed auger assembly is lower in elevation than the hitch.

17. The auger assembly according to claim 1 wherein there is provided a slide connection mounting the second auger member on top of first auger member.

18. The auger assembly according to claim 1 wherein the first auger member includes a generally channel shaped portion along at least part of its length with upstanding side walls and wherein there are provided supports on the side walls for carrying the second auger member in sliding movement along the supports.

19. The auger assembly according to claim 18 wherein the supports comprise flanges on the side walls.

20. The auger assembly according to claim 1 wherein the second auger member comprises a housing with side walls and an open bottom mounted at an upper end of the tube thereof.

21. The auger assembly according to claim 20 wherein the side walls of the housing mount on the first auger member for sliding therealong.

22. The auger assembly according to claim 21 wherein the first auger member has a channel shaped portion mounted on top of the tube thereof with side walls of the channel shaped portion and side walls of the housing cooperating in sliding movement with a bearing material therebetween.

23. The auger assembly according to claim 22 wherein the housing is contained within the channel shaped portion.

* * * * *